United States Patent
Henrichsen et al.

(10) Patent No.: US 11,421,647 B2
(45) Date of Patent: Aug. 23, 2022

(54) BEAM FOR A WIND TURBINE BLADE, WIND TURBINE BLADE, WIND TURBINE, METHOD FOR MANUFACTURING A BEAM FOR A WIND TURBINE BLADE AND METHOD FOR MANUFACTURING A WIND TURBINE BLADE

(71) Applicant: Siemens Gamesa Renewable Energy A/S, Brande (DK)

(72) Inventors: Soeren Randrup Daugaard Henrichsen, Vodskov (DK); Mogens Nielsen, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 202 days.

(21) Appl. No.: 16/837,388

(22) Filed: Apr. 1, 2020

(65) Prior Publication Data

US 2020/0318603 A1 Oct. 8, 2020

(30) Foreign Application Priority Data

Apr. 5, 2019 (EP) .................................... 19167473

(51) Int. Cl.
*F03D 1/06* (2006.01)
(52) U.S. Cl.
CPC ......... *F03D 1/0633* (2013.01); *F03D 1/0675* (2013.01); *F05B 2280/6003* (2013.01)
(58) Field of Classification Search
CPC .... F03D 1/0633; F03D 1/0641; F03D 1/0675; F03D 1/0683
See application file for complete search history.

(56) References Cited

U.S. PATENT DOCUMENTS 8,348,622 B2 * 1/2013 Bech .................. B29C 66/9534
416/229 R
8,475,135 B2 * 7/2013 Kuroiwa ............... F03D 1/0675
416/241 A
(Continued)

FOREIGN PATENT DOCUMENTS

EP 2815861 A1 12/2014
WO 2006002621 A1 1/2006
(Continued)

OTHER PUBLICATIONS

European Search Report and Written Opinion of the European Searching Authority dated Oct. 14, 2019 for Application No. 19167473.8.

*Primary Examiner* — Justin D Seabe
(74) *Attorney, Agent, or Firm* — Schmeiser, Olsen & Watts LLP (57) ABSTRACT

Provided is a beam for a wind turbine blade of a wind turbine, whereby the beam is made from a composite material including a matrix and a reinforcement. The beam includes at least one recessed longitudinal end section in which the beam includes at least one longitudinal recess arranged in a longitudinal direction or substantially a longitudinal direction of the beam extending from a longitudinal mid-section of the beam to a longitudinal end of the beam, so that the at least one longitudinal recess separates the beam into adjacent longitudinal beam portions, whereby the longitudinal beam portions are attached to the longitudinal mid-section.

18 Claims, 6 Drawing Sheets

(56) References Cited

U.S. PATENT DOCUMENTS

| | | | | |
|---|---|---|---|---|
| 8,696,317 B2* | 4/2014 | Rudling | ................ | F03D 1/0675 |
| | | | | 416/226 |
| 9,845,787 B2* | 12/2017 | Baker | .................. | B29C 70/304 |
| 9,995,271 B2* | 6/2018 | Dahl | ..................... | F03D 1/0658 |
| 10,330,074 B2* | 6/2019 | Jorgensen | ............... | B29C 70/08 |
| 2017/0218918 A1* | 8/2017 | Cieslak | ................ | B29C 70/546 |

FOREIGN PATENT DOCUMENTS

| | | |
|---|---|---|
| WO | 2010135737 A1 | 11/2010 |
| WO | 2015003713 A1 | 1/2015 |

\* cited by examiner

BEAM FOR A WIND TURBINE BLADE, WIND TURBINE BLADE, WIND TURBINE, METHOD FOR MANUFACTURING A BEAM FOR A WIND TURBINE BLADE AND METHOD FOR MANUFACTURING A WIND TURBINE BLADE

CROSS-REFERENCE TO RELATED APPLICATIONS

This application claims priority to European Application No. 19167473.8, having a filing date of Apr. 5, 2019, the entire contents of which are hereby incorporated by reference.

FIELD OF TECHNOLOGY

The following is directed to a beam for a wind turbine blade of a wind turbine, whereby the beam is made from a composite material comprising a matrix and a reinforcement. The following is further directed to a wind turbine blade for a wind turbine and a wind turbine. Moreover, the following is directed to a method for manufacturing a beam for a wind turbine blade of a wind turbine and a method for manufacturing a wind turbine blade of a wind turbine.

BACKGROUND

Wind turbine blades must be able to efficiently convert wind into spinning movement of the wind turbine blades, so that energy of the wind can be converted into rotary mechanical movement of a rotor to which the wind turbine blades are attached. It is preferable, to use materials having a high specific modulus (elastic modulus per mass density of a material), also known as stiffness to weight ratio, in wind turbine blades to deal with the square-cube law governing the scaling of wind turbine blades. Therefore, composite materials such as carbon fiber-reinforced plastic having a high specific modulus are commonly used in wind turbine blades. Such composite materials of high specific modulus are typically more expensive and more challenging when arranging them in wind turbine blades compared to materials having a lower specific modulus. Therefore, these composite materials of high specific modulus, such as carbon fiber-reinforced plastic, are used to reinforce the wind turbine blade, which is otherwise made from inexpensive composite materials, such as glass fiber-reinforced plastic. For example, the relatively inexpensive glass fiber-reinforced plastic may be used for the shell of the wind turbine blade and the relatively expensive carbon fiber-reinforced plastic may be used for the spar caps of the wind turbine blade. Due to their high stiffness, the composite materials having a high specific modulus largely contribute to the overall stiffness of the wind turbine blade. Furthermore, typically the composite materials having a high specific modulus are provided as beams having a narrow width, in particular compared to the width of the shell made from the composite material having a relatively lower specific modulus. Thereby, the loads applied to the wind turbine blade during operation of the wind turbine are largely concentrated on the narrow beam made from the composite material having a high specific modulus and therefrom released to the composite material having the relatively lower specific modulus and the larger surface, such as the shell of the wind turbine blade. For example, beams made from carbon fiber-reinforced plastic can carry up to three times the stress that a shell made from glass-fiber reinforced plastic of a wind turbine blade can carry. When releasing the load from the beam to the shell or another component of the wind turbine blade, to which the beam is attached, the line loads applied from longitudinal ends of the beam to the shell or the other component of the wind turbine blade are very high and may cause failure of the wind turbine blade.

For this reason, there is a need for a beam for a wind turbine blade of a wind turbine that is able to release the load from the beam to a shell or other component of the wind turbine blade without risk of failure of the wind turbine blade and there is a need for a manufacturing method for such a beam. Further, there is also a need for a wind turbine blade, including a manufacturing method thereof, and a wind turbine that are less susceptible to failure.

SUMMARY

This problem is solved by the subject-matter disclosed. Therefore, this aspect is solved by a beam for a wind turbine blade of a wind turbine, a wind turbine blade, a wind turbine, a method for manufacturing a beam for a wind turbine blade and a method for manufacturing a wind turbine blade. Further details of the invention unfold from the other claims as well as the description and the drawings. The features and details described in connection with the beam of the invention apply in connection with the wind turbine blade of embodiments of the invention, the wind turbine of embodiments of the invention, the method for manufacturing a beam according to embodiments of the invention and the method for manufacturing a wind turbine blade according to embodiments of the invention and the other way around, so that regarding the disclosure of the individual aspects of embodiments of the invention it is or can be referred to one another.

According to a first aspect of embodiments of the invention, the problem is solved by a beam for a wind turbine blade of a wind turbine, whereby the beam is made from a composite material comprising a matrix and a reinforcement, whereby the beam comprises at least one recessed longitudinal end section in which the beam comprises at least one longitudinal recess arranged in a longitudinal direction or substantially a longitudinal direction of the beam extending from a longitudinal mid-section of the beam to a longitudinal end of the beam, so that the at least one longitudinal recess separates the beam into adjacent longitudinal beam portions, whereby the longitudinal beam portions are attached to the longitudinal mid-section.

The beam according to embodiments of the invention may be used in any technical application, the preferable application being a wind turbine blade (also known as rotor blade) of a wind turbine. The beam comprises multiple longitudinal beam portions in its at least one recessed longitudinal end section, whereby the line loads from the beam can be favorably transferred through the longitudinal beam portions. Thereby, when releasing the load from the longitudinal beam portions instead of an unrecessed beam, the risk of failure of the shell or the component of the wind turbine blade, to which the beam is attached, can be reduced. Moreover, the beam according to embodiments of the invention is very flexible due to the at least one longitudinal recess and thereby has high twist capabilities, meaning that it can be twisted to a high degree without failure. Further, the beam of embodiments of the invention can be manufactured very cost-efficiently.

The beam has a longitudinal direction in the direction of its length, a width direction in the direction of its width and a thickness direction in the direction of its thickness. The longitudinal direction is along a longitudinal axis, the width direction is along a width axis and the thickness direction is along a thickness axis of the beam. The length of the beam is larger than its width and thickness. The width of the beam is larger than its thickness. In particular, the longitudinal beam portions have a length greater than a width and a thickness of the longitudinal beam portions. The substantially longitudinal direction of the beam comprises the longitudinal direction of the beam and deviations of direction from the longitudinal direction of a deviation angle formed between the longitudinal axis and the width axis of up to 20°, in particular of up to 10°.

In particular, the longitudinal mid-section is a portion of the beam that does not include the at least one recessed longitudinal end section. For example, when the beam is provided with two recessed longitudinal end sections, the longitudinal mid-section is provided in between the two recessed longitudinal end sections. For example, when the beam is provided with only one recessed longitudinal end section, the mid-section is made up from the entire portion of the beam that does not comprise the recessed longitudinal end section, i.e. a section of the beam from the recessed longitudinal end section to the longitudinal end of the beam that is opposite to the longitudinal end of the recessed longitudinal end portion. In particular, the longitudinal mid-section is a portion of the beam that comprises a center of the beam, the center being at a middle of the length of the beam. That the longitudinal beam portions are attached to the longitudinal mid-section means in other words that the longitudinal beam portions are held together by the longitudinal mid-section.

In particular, the length of the at least one longitudinal recess in a thickness direction of the beam is at least the thickness of the beam. This means, that the at least one longitudinal recess is provided along the entire thickness of the beam at that location. For example, the longitudinal recess may also be referred to as a longitudinal slot and the recessed longitudinal end portion may be referred to as a slotted longitudinal end portion. In other words, the longitudinal recess or slot has open sides towards opposite surfaces of the beam. These opposite surfaces of the beam are arranged orthogonally to the thickness direction of the beam. The at least one longitudinal recess has a length shorter than the length of the beam in the longitudinal direction of the beam. Each of the at least one longitudinal recess may have equal or substantially equal length compared to one another. Substantially equal length means that a deviation of up to 10%, in particular 5% in the length of a longitudinal recesses to any other of the longitudinal recesses may be possible. At least one of the at least one longitudinal recess may have a planar shape. Thereby, the longitudinal beam portions may have a planar shape. The longitudinal beam portions may further be designed as longitudinal beam straps. At least one of the at least one longitudinal recess may have a width, which is defined as the distance between adjacent longitudinal beam portions, of 1 mm to 1000 mm, in particular 2 mm to 200 mm and more particularly 5 mm to 50 mm.

The beam may be defined as an elongate structure having high tensile strength. The beam may alternatively be referred to as a strip, a band, a laminate or a bar, for example. Such beams or strips may be stacked on top of one another to further increase the tensile strength and make the beam or strip flexible against torsional load.

The beam may be made from at least one pultruded element. The beam may further be made from at least two pultruded elements, which are connected, in particularly adhered, to each other. The connection may be established by resin molding, for example. The at least two pultruded elements may be arranged on top or next to each other. In this case, the at least one longitudinal recess may be provided in both pultruded elements as one longitudinal recess. The beam may moreover be made from at least four pultruded elements, which are connected to each other. At least two of the at least four pultruded elements may be arranged next to each other with each one of the at least other two of the at least four pultruded elements arranged on top of each one of the two of the at least four pultruded elements. In this case, the at least one longitudinal recess may be provided in at least two pultruded elements as one longitudinal recess.

The at least one recessed longitudinal end section of the beam comprises at least two longitudinal recesses arranged in the longitudinal direction of the beam, whereby the at least two longitudinal recesses separate the beam into adjacent longitudinal beam portions. At least two of the at least two longitudinal recesses and all longitudinal recesses are arranged parallel to each other in the longitudinal direction of the beam. Thereby, there are at least three parallel adjacent longitudinal beam portions, whereby the load transfer capabilities are further increased.

The beam comprises at least three longitudinal recesses arranged in the longitudinal direction of the beam, whereby the at least three longitudinal recesses separate the beam into adjacent longitudinal beam portions. Thereby, there are at least four parallel adjacent longitudinal beam portions, whereby the load transfer capabilities are further increased. It is further preferred that the amount of longitudinal recesses is in the range of 3 to 50, 4 to 40 and 5 to 30.

In a preferred embodiment of the invention, at least one of the at least one longitudinal recess is arranged at a slant with respect to a thickness direction of the beam, whereby the thickness direction is transverse to the longitudinal direction of the beam and a width direction of the beam. The thickness direction may in particular be orthogonal to the longitudinal direction of the beam and orthogonal to the width direction of the beam. A recess angle of the slant formed between the thickness direction and the longitudinal recess may be in the range of 1° to 60°, in particular 5° to 60° and more particularly 10° to 60°. The recess angle may correspond to a cutting angle of a cut by means of which the longitudinal recess is introduced into the beam. Thereby, a surface of the longitudinal beam portion next to the longitudinal recesses is increased. Thus, there is more surface provided through which the line loads may be transmitted, and the load transfer capabilities of the recessed longitudinal end portion is effectively increased.

In a further preferred embodiment of the invention, at least one of the longitudinal beam portions may have a quadrilateral cross section, in particular a parallelogram cross section and more particularly a rectangular cross section. Thereby, an alignment of the longitudinal beam portions towards each other is facilitated and their ability to release loads is improved.

In yet another preferred embodiment of the invention, at least two adjacent longitudinal beam portions are arranged to partially overlap each other. This can be done by spreading out the longitudinal beam portions in the width direction of the beam. Thereby, the line loads are effectively transmitted between the longitudinal beam portions, so that the line loads are spread and less harmful when applied to a component to which the beam is attached, such as a shell of a wind turbine blade. It is further preferred that an overlapping area of the overlapping adjacent longitudinal beam portions decreases along a longitudinal direction of the longitudinal beam portions. In particular, the overlapping area of the overlapping adjacent longitudinal beam portions is larger close to the longitudinal mid-section of the beam compared to an overlapping area close to a longitudinal end of the beam. Thereby, the line loads are smoothly transitioned towards the longitudinal end of the beam.

In a yet further preferred embodiment of the invention, at least one of the at least one recessed longitudinal end section has the shape of a fan. The fan can be described as a modified trapezoid having two non-parallel sides and two parallel sides, whereby the modification is that one of the parallel sides is a rounded site. In particular, the length of the rounded side may be larger than the length of its parallel side. Thereby, the area for transmitting the line load from the beam to a component attached thereto is increased by a large margin, effectively providing better load transfer capabilities of the beam.

In another preferred embodiment of the invention, at least one of the at least one recessed longitudinal end section is tapered in the thickness direction of the beam. A tapering angle may be in the range of 0.3° to 5°, in particular 0.5° to 3° and more particularly 0.6° to 2°, for example. The tapering angle of the tapering is defined between the top surface of the longitudinal mid-section and the tapered top surface of the recessed longitudinal end section. Thereby, the line loads are transmitted not only in a width direction of the beam along the longitudinal beam portions, but also in a thickness direction of the beam, effectively improving the load transfer capabilities of the beam.

In a preferred embodiment of the invention, the reinforcement of the composite material comprises unidirectional fibers arranged in the longitudinal direction of the beam. In particular, the reinforcement of the composite material is a plurality of unidirectional fibers. The stiffness of the beam is thereby largely maintained even though it comprises the at least one longitudinal recess, because the at least one longitudinal recess does not transversely cut fibers of the reinforcement. Thus, the unidirectional fibers run along or parallel to the at least one longitudinal recess of the beam.

In a further preferred embodiment of the invention, the composite material is a fiber-reinforced plastic, in particular a carbon fiber-reinforced plastic. Fiber-reinforced plastics, in particular carbon fiber-reinforced plastic, have a particularly high stiffness-to-weight ratio and can therefore be used where high loads are applied to the beam and the beam is transferring these loads to other components. Further fiber-reinforced plastics for use in the beam may be glass fiber-reinforced plastic and aramid fiber-reinforced plastic, for example. In a carbon fiber-reinforced plastic, carbon fibers are the reinforcement and a polymer resin, such as epoxy, is the matrix. A carbon fiber-reinforced plastic may comprise further fibers such as glass fibers or aramid fibers as reinforcement. However, it is preferable that the carbon fiber-reinforced plastic comprises predominantly carbon fibers as reinforcement. Alternatively, as the composite material of the beam, composite wood, ceramic matrix composite or a metal matrix composite may be used.

In yet another preferred embodiment of the invention, at least one of the at least one longitudinal recess has a length of 2% to 40%, in particular 3% to 35% and more particularly 4% to 20% of a length of the beam. Accordingly, at least one of the at least one recessed longitudinal end section may have a length of 2% to 40%, in particular 3% to 35% and more particularly 4% to 20% of the length of the beam. In particular, the length of the at least one recessed longitudinal end section may be equal to the length of the at least one longitudinal recess provided therein. The beam may have exactly two recessed longitudinal end sections provided at the longitudinal ends of the beam. Further, the longitudinal mid-section of the beam may have a length of 20% to 96%, in particular 30% to 94% and more particularly 60% to 92% of the length of the beam. Thereby, the beam is provided with high load transfer capabilities along a large length of the beam while still providing sufficient structural integrity and stiffness.

According to a second aspect of embodiments of the invention, there is a wind turbine blade of a wind turbine, the wind turbine blade comprising a shell and a spar, whereby the shell and/or the spar comprises the beam according to any of the previous claims.

In a preferred embodiment of the invention, the beam is attached to the shell and/or the spar comprising the beam is arranged in the wind turbine blade at the trailing edge or within a distance of up to 30%, in particular 20% and more particularly 10% of a width of the wind turbine blade from the trailing edge. Here, the high twist capabilities and load transfer capabilities of the beam are particularly well facilitated.

According to a third aspect of embodiments of the invention, there is a wind turbine comprising a wind turbine blade according to the invention.

According to a fourth aspect of embodiments of the invention, there is a method for manufacturing a beam for a wind turbine blade of a wind turbine, whereby the beam is made from a composite material comprising a matrix and a reinforcement, the method comprising the step of cutting at least one longitudinal recess in a longitudinal direction or substantially in a longitudinal direction of the beam from a longitudinal mid-section of the beam to a longitudinal end of the beam, so that the beam comprises at least one recessed longitudinal end section and the at least one longitudinal recess separates the beam into adjacent longitudinal beam portions, whereby the longitudinal beam portions are attached to the longitudinal mid-section. The cutting may be performed mechanically or by means of a laser, for example.

In a preferred embodiment of the invention, the method further comprises the step of spreading out the longitudinal beam portions in the at least one recessed longitudinal end sections in a width direction of the beam, which is transverse to the longitudinal direction of the beam and a thickness direction of the beam, so that at least two adjacent longitudinal beam portions partially overlap each other and/or at least one of the at least one recessed longitudinal end sections is shaped as a fan.

According to a fifth aspect of embodiments of the invention, there is a method for manufacturing a wind turbine blade of a wind turbine, wherein the wind turbine blade comprises a shell and a spar and the method comprises the method of manufacturing a beam according to embodiments of the invention, whereby the adjacent longitudinal beam portions are connected to the shell, the shell comprising a composite material having a lower stiffness-to-weight-ratio than the composite material of the longitudinal beam portions.

BRIEF DESCRIPTION

Some of the embodiments will be described in detail, with references to the following Figures, wherein like designations denote like members, wherein.

DETAILED DESCRIPTION

Figure 1:
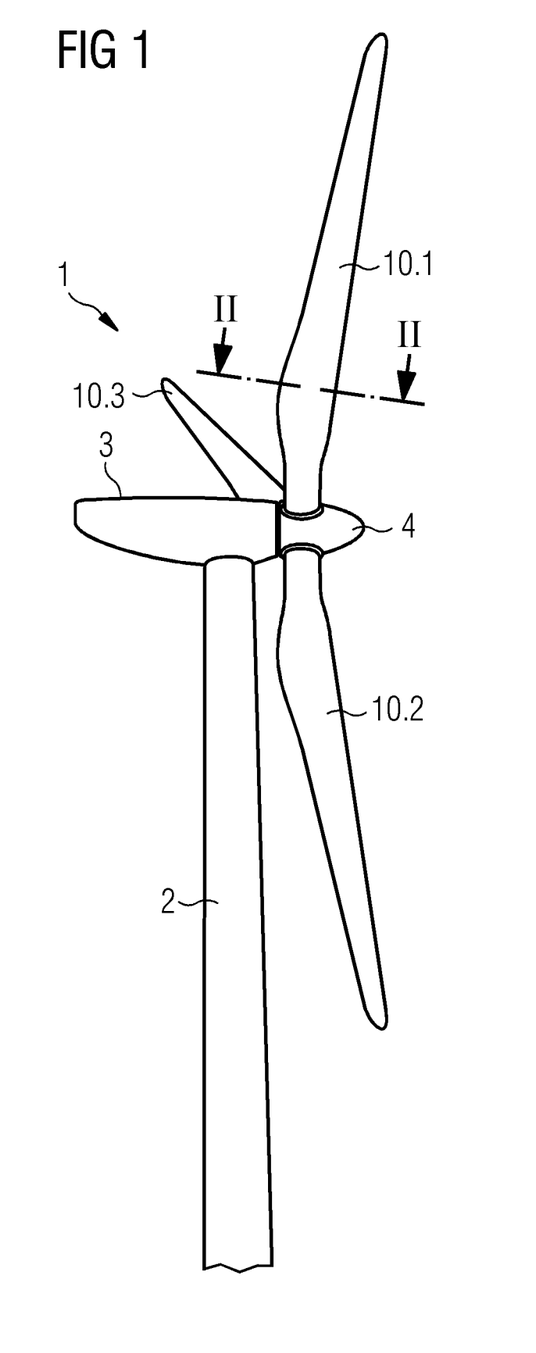
FIG. 1 a side view on an embodiment of a wind turbine according to embodiments of the invention.

FIG. 1 is a side view on an embodiment of a wind turbine 1 according to embodiments of the invention. The wind turbine 1 is provided with three wind turbine blades 10.1, 10.2, 10.3 attached to a hub 4 of the wind turbine 1, which is connected to a nacelle 3 of the wind turbine 1, the nacelle 3 being supported on a mast 2 of the wind turbine 1.

Figure 2:
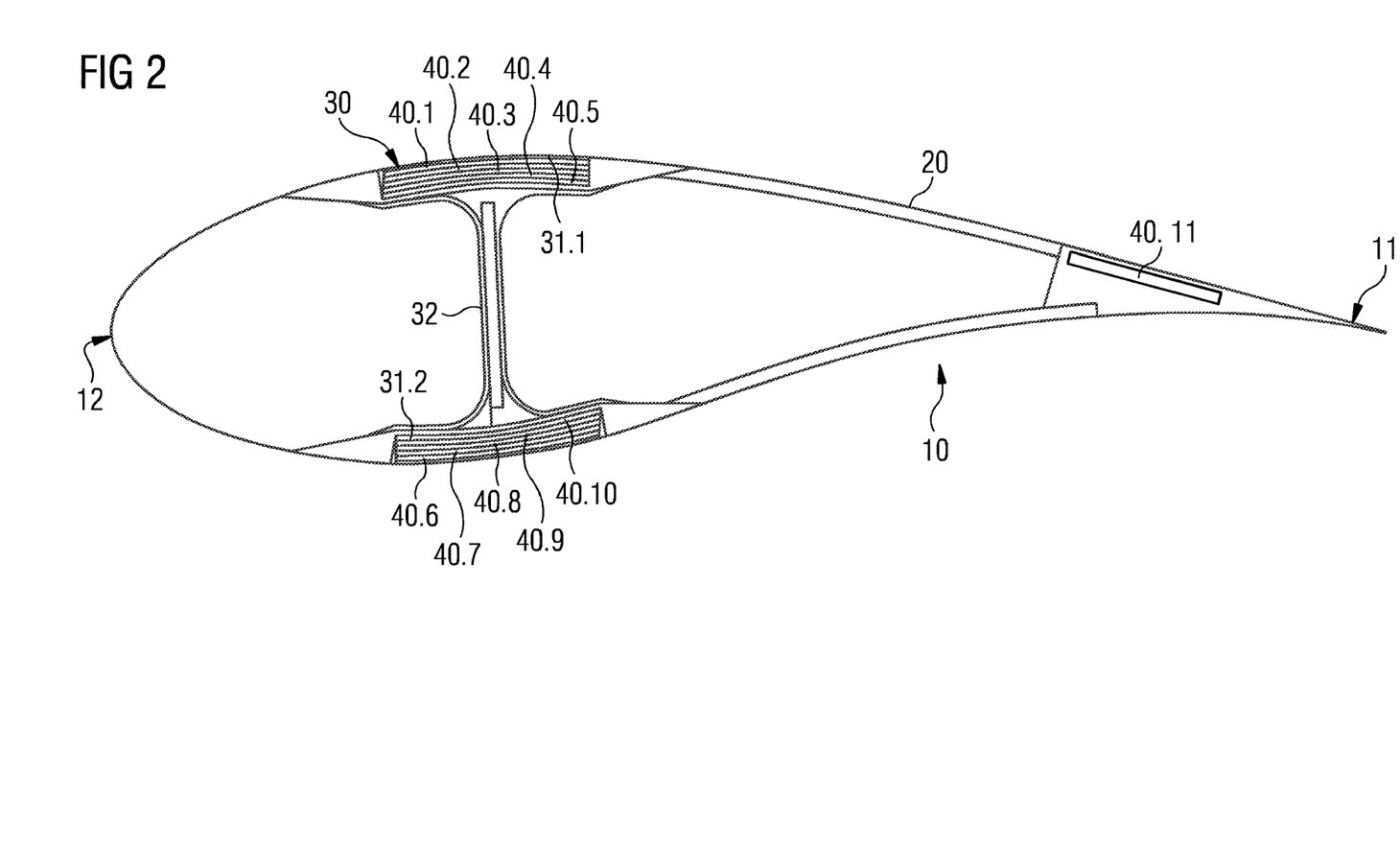
FIG. 2 a sectional view along a transversal plane of an embodiment of a wind turbine blade according to embodiments of the invention and of the wind turbine of FIG. 1.

FIG. 2 is a sectional view along the transversal plane of line II-II depicted in FIG. 1 of the wind turbine blade 10.1 of the wind turbine 1 of FIG. 1. The wind turbine blade 10 has a trailing edge 11 and a leading edge 12. The wind turbine blade 10.1 comprises a shell 20 and a spar 30. The spar 30 comprises two spar caps 31.1, 31.2. The two spar caps 31.1, 31.2 face each other and are connected to one another by means of a spar web 32. The spar cap 31.1 comprises a stack of five beams 40.1, 40.2, 40.3, 40.4, 40.5 stacked on top of one another. The spar cap 31.2 comprises a stack of five further beams 40.6, 40.7, 40.8, 40.9, 40.10 stacked on top of one another. Yet another beam 40.11 is arranged within the shell at a distance of 5% of the width of the wind turbine blade 10 from the trailing edge 11 of the wind turbine blade 10.

Figure 3:
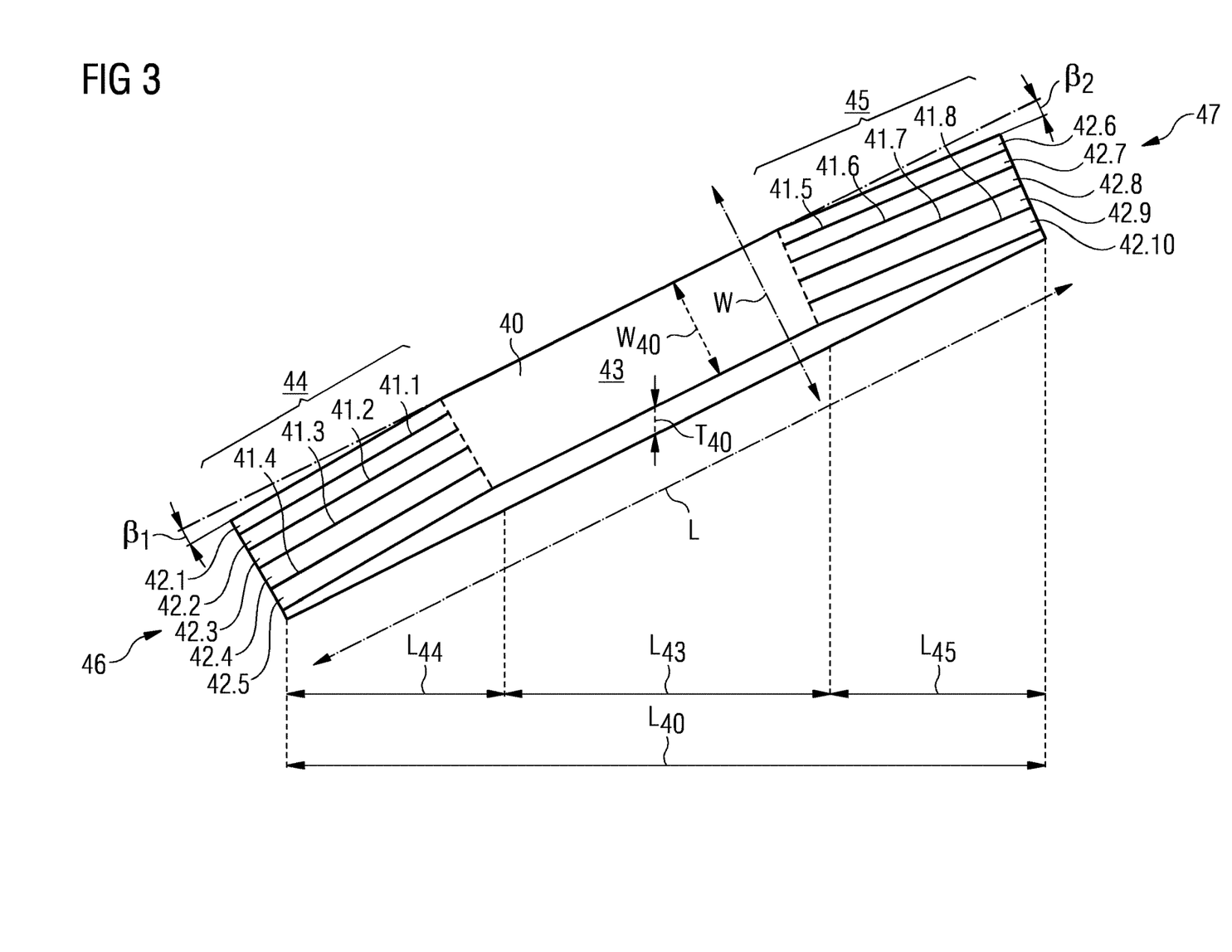
FIG. 3 a side perspective view on a first embodiment of a beam according to embodiments of the invention.

FIG. 3 is a side perspective view on a first embodiment of a beam 40 according to embodiments of the invention. Such a beam 40 may be used as one, several or all of the beams 40.1, 40.2, 40.3, 40.4, 40.5, 40.6, 40.7, 40.8, 40.9, 40.1, 40.11 in the wind turbine blade 10 of FIG. 2. In this particular embodiment, the beam 40 is a pultruded element made from carbon fiber-reinforced plastic.

The beam 40 has a longitudinal mid-section 43, a first recessed longitudinal end section 44 and a second recessed longitudinal end section 45. The longitudinal mid-section 43 is arranged in between the first recessed longitudinal end section 44 and the second recessed longitudinal end section 45. The first recessed longitudinal end section 44 extends to a first longitudinal end 46 of the beam 40 and the second recessed longitudinal end section 45 extends to a second longitudinal end 47 of the beam 40. The length of the beam 40 is the sum of the length $L_{43}$ of the longitudinal mid-section 43, the length $L_{44}$ of the first recessed longitudinal end section 44 and the length $L_{45}$ of the second recessed longitudinal end section 45 measured in a longitudinal direction L of the beam 40. The beam 40 further has a width $W_{40}$ measured in a width direction W of the beam 40 and a thickness $T_{40}$ measured in a thickness direction T of the beam 40 as can be seen best in FIG. 5. The width $W_{40}$ of the beam 40 is constant in the longitudinal mid-section. Moreover, the width $W_{40}$ of the beam 40 is constant in the first recessed longitudinal end section 44 and the second recessed longitudinal end section 45. The thickness $T_{40}$ is also constant in the longitudinal mid-section 43. However, the first recessed longitudinal end section 44 and the second recessed longitudinal end section 45 are tapered in their thickness $T_{40}$. In particular, the first recessed longitudinal end section 44 is thickness tapered with a tapering angle $\beta_1$ and the second recessed longitudinal end section 45 is thickness tapered with a tapering angle $\square 2$. The tapering angles $\beta_1$, $\beta_2$ may be equal or different from another.

Four longitudinal recesses 41.1, 41.2, 41.3, 41.4 are arranged parallel to one another in the longitudinal direction L of the beam 40 at a first longitudinal end 46 of the beam 40. The longitudinal recesses 41.1, 41.2, 41.3, 41.4 are thereby forming the first recessed longitudinal end section 44. The four longitudinal recesses 41.1, 41.2, 41.3, 41.4 separate the beam 40 into five adjacent longitudinal beam portions 42.1, 42.2, 42.3, 42.4, 42.5. The longitudinal recesses 41.1, 41.2, 41.3, 41.4 and the longitudinal beam portions 42.1, 42.2, 42.3, 42.4, 42.5 have the tapered thickness T40 of the beam 40. The longitudinal beam portions 42.1, 42.2, 42.3, 42.4 are attached to each other by means of the longitudinal mid-section 43 of the beam 40, which is connected to the first recessed longitudinal end section 44. The longitudinal mid-section 43 does not have any of the longitudinal recesses 41.

Four further longitudinal recesses 41.5, 41.6, 41.7, 41.8 are arranged parallel to one another in the longitudinal direction L of the beam 40 at the second longitudinal end 47 of the beam 40. The longitudinal recesses 41.5, 41.6, 41.7, 41.8 are thereby forming the second recessed longitudinal end section 45. The four longitudinal recesses 41.5, 41.6, 41.7, 41.8 separate the beam 40 into five adjacent longitudinal beam portions 42.6, 42.7, 42.8, 42.9, 42.10. The longitudinal recesses 41.5, 41.6, 41.7, 41.8 and the longitudinal beam portions 42.6, 42.7, 42.8, 42.9, 42.10 have the tapered thickness T40 of the beam 40. The longitudinal beam portions 42.6, 42.7, 42.8, 42.9, 42.10 are attached to each other by means of the longitudinal mid-section 43 of the beam 40, which is connected to the second recessed longitudinal end section 45 as well.

Figure 4:
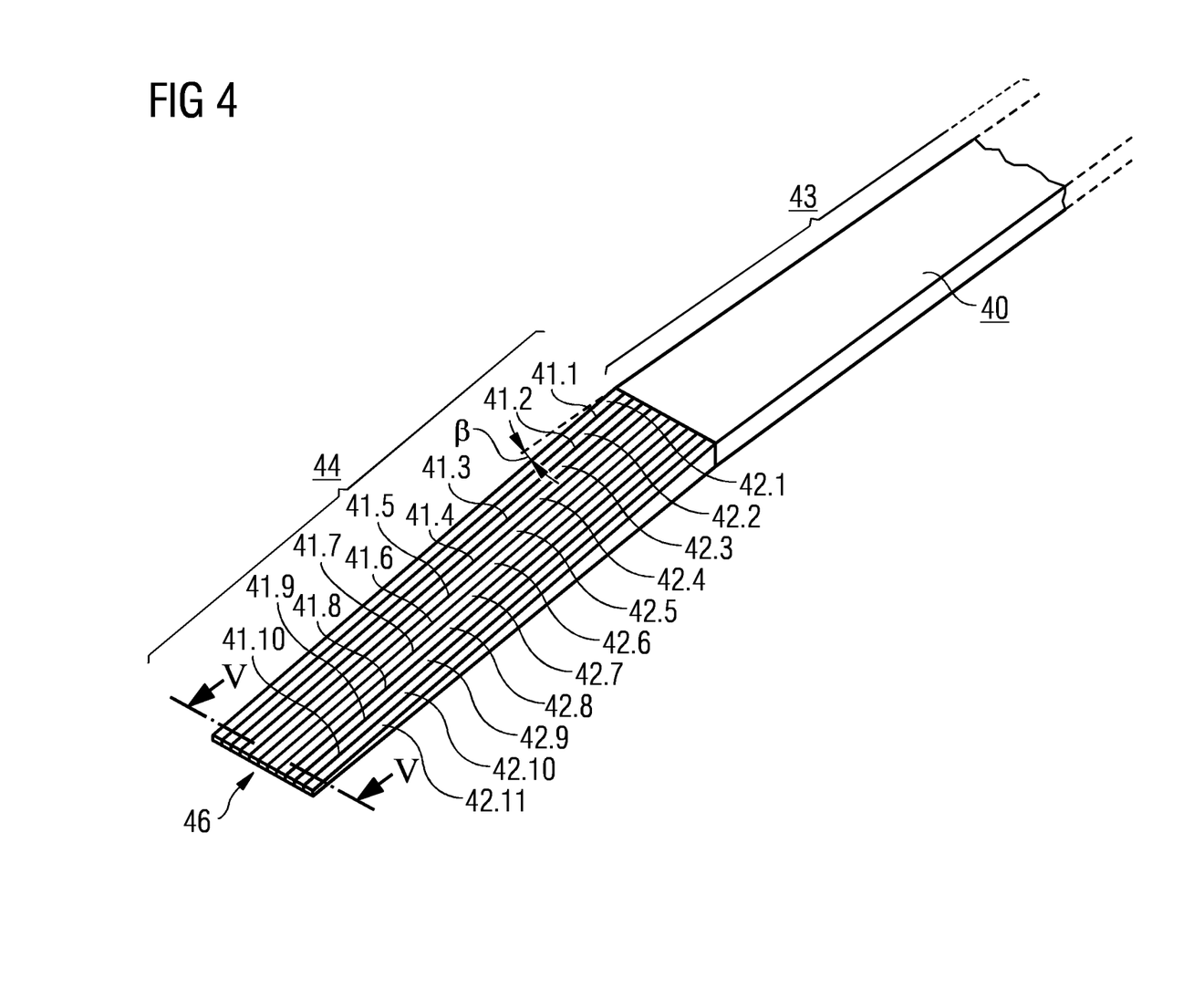
FIG. 4 a side perspective view on a second embodiment of a beam according to embodiments of the invention.

FIG. 4 is a side perspective view on a portion of a second embodiment of a beam 40 according to embodiments of the invention. Ten longitudinal recesses 41.1, 41.2, 41.3, 41.4, 41.5, 41.6, 41.7, 41.8, 41.9, 41.10 are arranged parallel to one another in the longitudinal direction of the beam 40, whereby the longitudinal recesses 41.1, 41.2, 41.3, 41.4, 41.5, 41.6, 41.7, 41.8, 41.9, 41.10 separate the beam 40 into eleven adjacent longitudinal beam portions 42.1, 42.2, 42.3, 42.4, 42.5, 42.6, 42.7, 42.8, 42.9, 42.10, 42.11. The longitudinal recesses 41.1, 41.2, 41.3, 41.4, 41.5, 41.6, 41.7, 41.8, 41.9, 41.10 and the longitudinal beam portions 42.1, 42.2, 42.3, 42.4, 42.5, 42.6, 42.7, 42.8, 42.9, 42.10, 42.11 have the tapered thickness T40 of the beam 40 at their respective location. The longitudinal recesses 41.1, 41.2, 41.3, 41.4, 41.5, 41.6, 41.7, 41.8, 41.9, 41.10 are arranged in the first recessed longitudinal end section 44 having the first longitudinal end 46. The second longitudinal end 47 of the beam 40 is not shown in this figure. It may have a second recessed longitudinal end section 45 corresponding or similar to the first recessed longitudinal end section 44. The longitudinal beam portions 42.1, 42.2, 42.3, 42.4, 42.5, 42.6, 42.7, 42.8, 42.9, 42.10, 42.11 are attached to each other by means of the longitudinal mid-section 43 of the beam 40, which is connected to the first longitudinal recess section 44.

Figure 5:
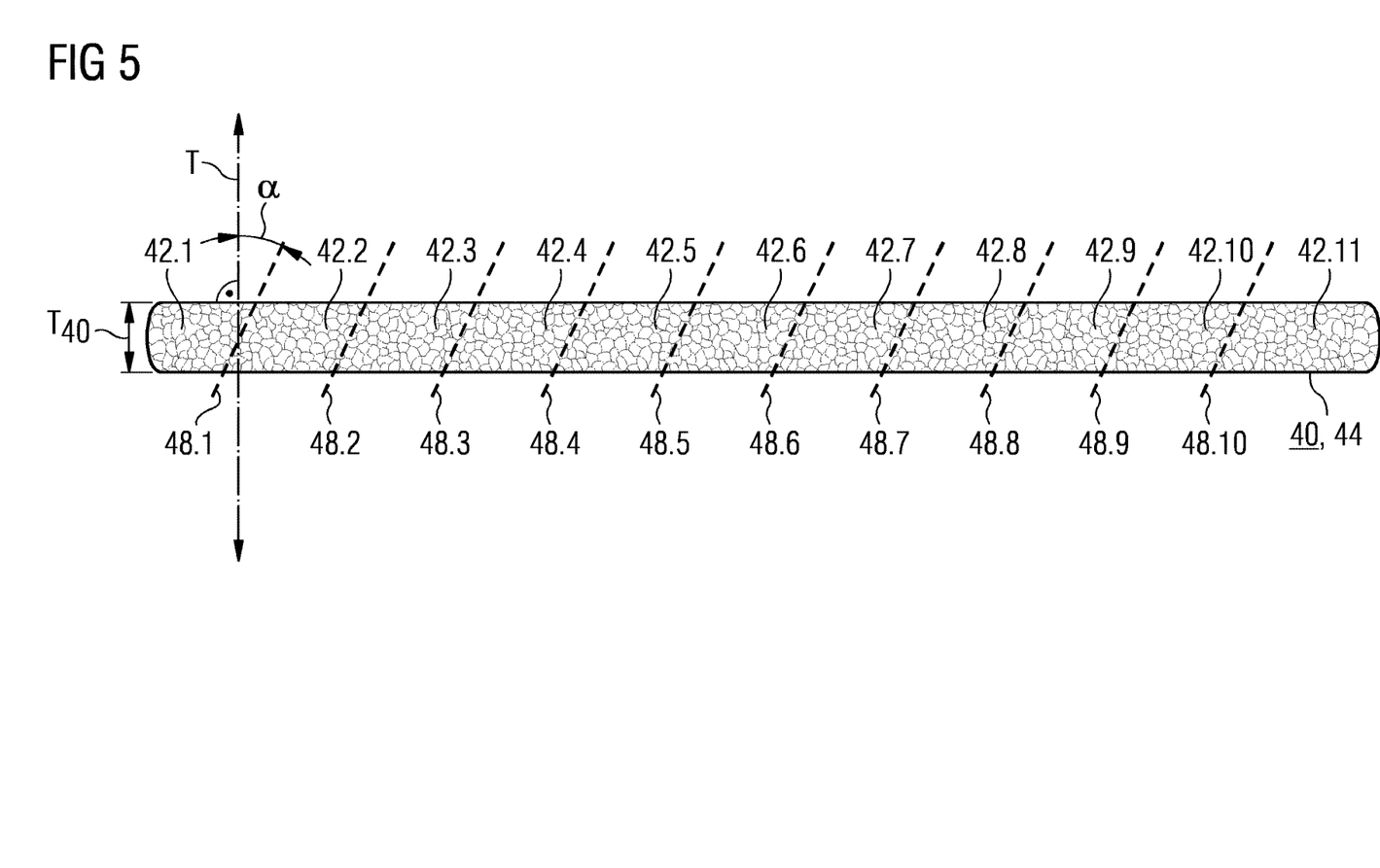
FIG. 5 a sectional view along a transversal plane of the beam of FIG. 4.

FIG. 5 is a sectional view along line V-V of the beam 40 of FIG. 4. Here, the cuts 48.1, 48.2, 48.3, 48.4, 48.5, 48.6, 48.7, 48.8, 48.9, 48.10 through the beam 40 by which means the longitudinal recesses 41.1, 41.2, 41.3, 41.4, 41.5, 41.6, 41.7, 41.8, 41.9, 41.10 separate the longitudinal beam portions 42.1, 42.2, 42.3, 42.4, 42.5, 42.6, 42.7, 42.8, 42.9, 42.10, 42.11 from one another are indicated. The cuts 48.1, 48.2, 48.3, 48.4, 48.5, 48.6, 48.7, 48.8, 48.9, 48.10 are introduced into the beam 40 at a constant cutting angle α. The cutting angle α is an angle between a line of the cuts 48, here cut 48.1, and a thickness direction T in which the thickness $T_{40}$ of the beam 40 can be measured. The thickness direction is perpendicular to a top surface of the beam 40. The longitudinal recesses 41.1, 41.2, 41.3, 41.4, 41.5, 41.6, 41.7, 41.8, 41.9, 41.10 are thereby arranged at a slant with respect to the thickness direction of the beam 40. The recess angle of the slant corresponds to the cutting angle α. Each individual cut or multiple cuts of the cuts 48.1, 48.2, 48.3, 48.4, 48.5, 48.6, 48.7, 48.8, 48.9, 48.10 may have a different cutting angle α. Moreover, it is possible that the lines of cutting in the beam 40 cross each other.

Figure 6:
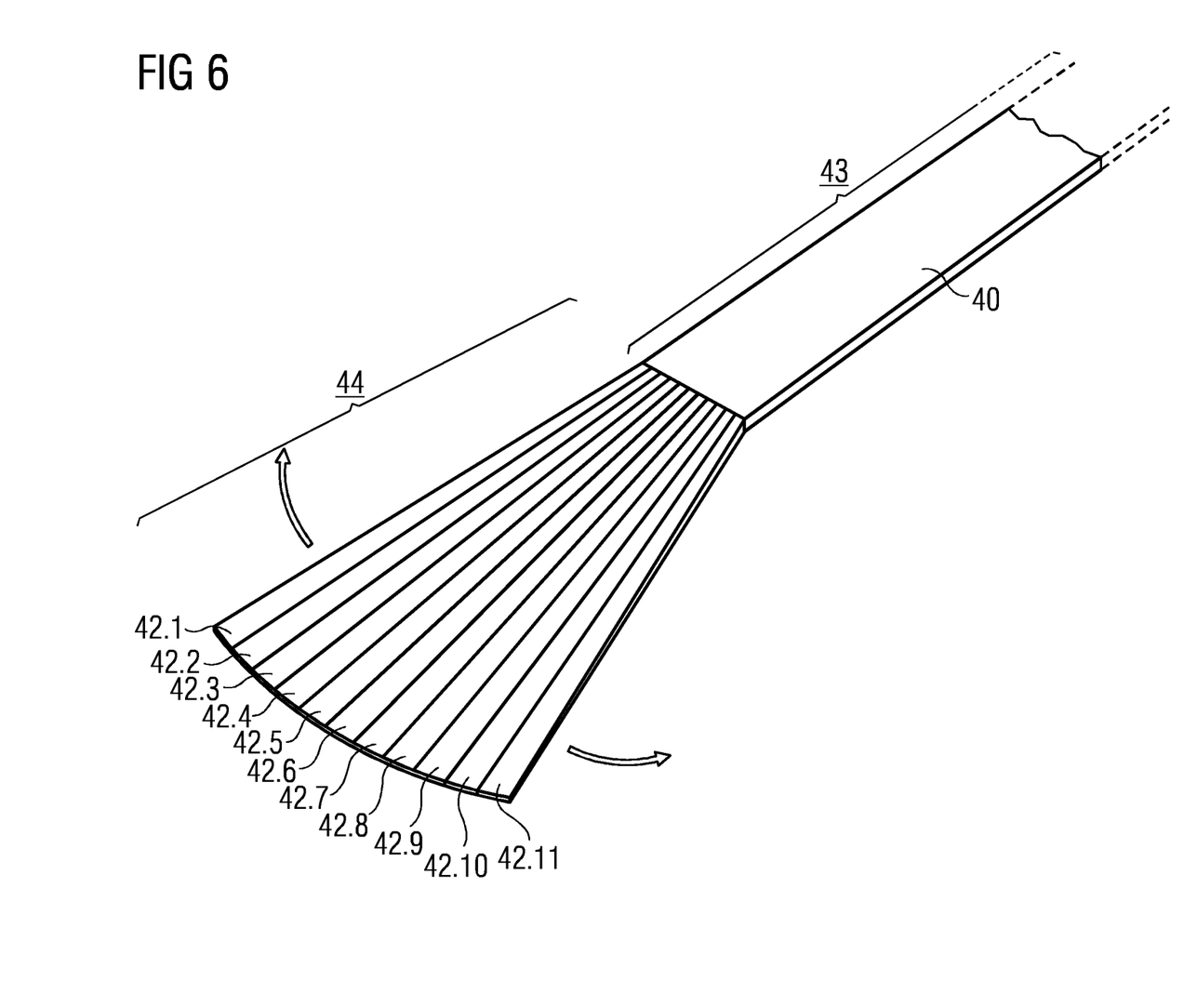
FIG. 6 a side perspective view on the beam of FIG. 4, in which the longitudinal beam portions are spread out.

FIG. 6 is a side perspective view on the beam 40 of FIG. 4, in which the longitudinal beam portions 42.1, 42.2, 42.3, 42.4, 42.5, 42.6, 42.7, 42.8, 42.9, 42.10, 42.11 have been spread out in the width direction W of the beam 40 as it is being indicated by the arrows. As a result, the first recessed longitudinal end section 44 has the shape of a fan.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A beam for a wind turbine blade of a wind turbine, wherein the beam is made from a composite material comprising a matrix and a reinforcement,
    wherein the beam comprises at least one recessed longitudinal end section in which the beam comprises at least one longitudinal recess arranged in a longitudinal direction or substantially a longitudinal direction of the beam extending from a longitudinal mid-section of the beam to a longitudinal end of the beam, such that the at least one longitudinal recess separates the beam into adjacent longitudinal beam portions, wherein the longitudinal beam portions are attached to the longitudinal mid-section, wherein the at least one recessed longitudinal end section has a fan shape at a distal portion of the at least one recessed longitudinal end section, and wherein a width of the fan shape at the distal portion of the at least one recessed longitudinal end section is greater than a width of the longitudinal mid-section of the beam.

2. The beam according to claim 1, wherein at least one of the at least one longitudinal recess is arranged at a slant with respect to a thickness direction of the beam, wherein the thickness direction is transverse to the longitudinal direction of the beam and a width direction of the beam.

3. The beam according to claim 1, wherein at least one of the longitudinal beam portions has a quadrilateral cross section.

4. The beam according to claim 1, wherein at least two adjacent longitudinal beam portions are arranged to partially overlap each other.

5. The beam according to claim 1, wherein wherein the distal portion of the at least one recessed longitudinal end section connects to a shell of the wind turbine and/or another component of the wind turbine.

6. The beam according to claim 1, wherein at least one of the at least one recessed longitudinal end section is tapered in the thickness direction of the beam.

7. The beam according to claim 1, wherein the reinforcement of the composite material comprises unidirectional fibers arranged in the longitudinal direction of the beam.

8. The beam according to claim 1, wherein the composite material is a fiber-reinforced plastic.

9. The beam according to claim 1, wherein at least one of the at least one longitudinal recess has a length of 2% to 40% of a length of the beam.

10. A wind turbine blade of a wind turbine, the wind turbine blade comprising a shell and a spar, wherein at least one of the shell and the spar comprises the beam according to claim 1.

11. The wind turbine blade according to claim 10, wherein the beam is attached to at least one of the shell and the spar comprising the beam is arranged in the wind turbine blade at the trailing edge or within a distance of up to 30% of a width of the wind turbine blade from the trailing edge.

12. A wind turbine comprising the wind turbine blade of claim 10.

13. A method for manufacturing a beam for a wind turbine blade of a wind turbine, wherein the beam is made from a composite material comprising a matrix and a reinforcement, the method comprising:
    cutting at least one longitudinal recess in a longitudinal direction or substantially in a longitudinal direction of the beam from a longitudinal mid-section of the beam to a longitudinal end of the beam, such that the beam has at least one recessed longitudinal end section and the at least one longitudinal recess separates the beam into adjacent longitudinal beam portions, wherein the longitudinal beam portions are attached to the longitudinal mid-section, and
    spreading out the longitudinal beam portions in the at least one recessed longitudinal end sections in a width direction of the beam, which is transverse to the longitudinal direction of the beam and a thickness direction of the beam, such that at least two adjacent longitudinal beam portions partially overlap at least one of each other and at least one of the at least one recessed longitudinal end sections is shaped as a fan at a distal portion of the at least one recessed longitudinal end section.

14. The method for manufacturing a beam according to claim 13, wherein wherein the distal portion of the at least one recessed longitudinal end section connects to a shell of the wind turbine and/or another component of the wind turbine.

15. A method for manufacturing a wind turbine blade of a wind turbine, wherein the wind turbine blade comprises a shell and a spar and the method comprises the method of manufacturing a beam according to the method of claim 13, wherein the adjacent longitudinal beam portions are connected to the shell, the shell comprising a composite material having a lower stiffness-to-weight-ratio than the composite material of the longitudinal beam portions.

16. The beam according to claim 3, wherein at least one of the longitudinal beam portions has a parallelogram cross section.

17. The beam according to claim 16, wherein at least one of the longitudinal beam portions has a rectangular cross section.

18. The beam according to claim 3, wherein the composite material is a carbon fiber-reinforced plastic.

* * * * *